US012466405B2

(12) United States Patent
Gupta et al.

(10) Patent No.: US 12,466,405 B2
(45) Date of Patent: Nov. 11, 2025

(54) TRIGGER EVENT PERSONALIZED ADAPTIVE CRUISE CONTROL (P-ACC)

(71) Applicant: TOYOTA MOTOR ENGINEERING & MANUFACTURING NORTH AMERICA, INC., Plano, TX (US)

(72) Inventors: Rohit Gupta, Santa Clara, CA (US); Amr Abdelraouf, Redwood City, CA (US); Kyungtae Han, Palo Alto, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/438,129

(22) Filed: Feb. 9, 2024

(65) Prior Publication Data
US 2025/0256710 A1    Aug. 14, 2025

(51) Int. Cl.
*B60W 30/14*    (2006.01)
*B60W 30/16*    (2020.01)
(Continued)

(52) U.S. Cl.
CPC .......... *B60W 30/143* (2013.01); *B60W 30/16* (2013.01); *B60W 40/09* (2013.01);
(Continued)

(58) Field of Classification Search
CPC .... B60W 30/143; B60W 30/16; B60W 40/09; B60W 50/0097; B60W 2050/0028;
(Continued)

(56) References Cited

U.S. PATENT DOCUMENTS 8,810,383 B2    8/2014  Lippman
9,399,465 B2    7/2016  Slaton
(Continued)

OTHER PUBLICATIONS

Yin, W. Machine Learning for Adaptive Cruise Control Target Selection, Google Scholar, KTH—School of Electrical Engineering and Computer Science—Thesis, Sep. 2019, pp. 1-62. (Year: 2019).*

(Continued)

*Primary Examiner* — Russell Frejd
(74) *Attorney, Agent, or Firm* — SHEPPARD, MULLIN, RICHTER & HAMPTON LLP; Daniel N. Yannuzzi

(57) ABSTRACT

Systems and methods are provided for learning a driving behavior during a cut-in cut-out event or other triggering event to create a profile that adjusts operation of the adaptive cruise control (ACC) component of the vehicle to mimic the preferences of the driver. The profile may be based on data collected during a previous cut-in cut-out event or other triggering event. The data may be transmitted to an adaptive cruise control system that uses the data as input to a machine learning model. Output of the machine learning model may update the profile for the driver that operates the vehicle in ACC during the cut-in cut-out event. When the vehicle is operating in ACC and an event is within a threshold value of the cut-in cut-out event occurs at a later time, the vehicle may apply rules defined in the profile.

20 Claims, 9 Drawing Sheets

(51) Int. Cl.
*B60W 40/09* (2012.01)
*B60W 50/00* (2006.01)

(52) U.S. Cl.
CPC . *B60W 50/0097* (2013.01); *B60W 2050/0028* (2013.01); *B60W 2050/0083* (2013.01); *B60W 2540/049* (2020.02); *B60W 2540/30* (2013.01); *B60W 2554/404* (2020.02); *B60W 2554/802* (2020.02)

(58) Field of Classification Search
CPC ... B60W 2050/0083; B60W 2540/049; B60W 2540/30; B60W 2554/404; B60W 2554/802
See application file for complete search history.

(56) References Cited

U.S. PATENT DOCUMENTS

| | | | |
|---|---|---|---|
| 9,827,986 | B2 | 11/2017 | Pilutti |
| 10,286,915 | B2 | 5/2019 | Xiao |
| 11,787,404 | B2 | 10/2023 | Wang |
| 2017/0057517 | A1 | 3/2017 | Huq |
| 2021/0146904 | A1* | 5/2021 | Rodrigues ............... B60T 17/02 |
| 2022/0126864 | A1* | 4/2022 | Moustafa ................. G06T 9/00 |
| 2022/0161816 | A1* | 5/2022 | Gyllenhammar ...... G06V 20/56 |
| 2022/0314990 | A1 | 10/2022 | Han |
| 2022/0396266 | A1 | 12/2022 | Kim |
| 2023/0035228 | A1 | 2/2023 | Gupta |
| 2023/0047354 | A1 | 2/2023 | Wang |
| 2023/0113790 | A1 | 4/2023 | Pankiewicz |
| 2023/0211660 | A1 | 7/2023 | Ziran |
| 2023/0219569 | A1 | 7/2023 | Zhao |
| 2023/0227037 | A1 | 7/2023 | Zhao |
| 2023/0234613 | A1* | 7/2023 | Whiteside .......... B60W 60/0011 |
| 2023/0334725 | A1* | 10/2023 | Marsden ................ H04W 4/024 |
| 2024/0194004 | A1* | 6/2024 | Whiteside ........... G06F 11/3696 |

OTHER PUBLICATIONS

Boddupalli et al, S. Resilient Cooperative Adaptive Cruise Control for Autonomous Vehicles Using Machine Learning, Google Scholar, IEEE Transactions on Intelligent Transportation Systems, vol. 23, No. 9, Sep. 2022, pp. 15655-15672. (Year: 2022).*

Desjardins et al, C. Cooperative Adaptive Cruise Control: A Reinforcement Learning Approach, Google Scholar, IEEE Transactions on Intelligent Transportation Systems, vol. 12, Iss. 4, Dec. 2011, pp. 1248-1260. (Year: 2011).*

* cited by examiner

TRIGGER EVENT PERSONALIZED ADAPTIVE CRUISE CONTROL (P-ACC)

TECHNICAL FIELD

The present disclosure relates generally to providing personalized Adaptive Cruise Control (ACC) in a vehicle corresponding to observed driving behaviors of a driver in a vehicle.

DESCRIPTION OF RELATED ART

Many motor vehicles have the ability to activate and deactivate cruise control. Cruise control is an electronic device in the vehicle that can be switched on to maintain a selected constant speed without the use of the accelerator. The brake pedal may deactivate the cruise control functionality and the vehicle can return to a decreasing speed until the accelerator or the cruise control functionality is reactivated.

BRIEF SUMMARY OF THE DISCLOSURE

According to various embodiments of the disclosed technology implement personalized adaptive cruise control (ACC). The personalized ACC may be implemented by a vehicle control system. The vehicle control system may comprise, for example, an ACC circuit, a processor, and a memory coupled to the processor to store instructions. When the instructions are executed by the processor, the processor may capture event data comprising driver operations and traffic events associated with a cut-in cut-out event. The processor may transmit the event data associated with the vehicle to an adaptive cruise control system, where the adaptive cruise control system uses the event data as input to a machine learning model, and training of the machine learning model updates a profile for the driver that characterizes an observed driving style of the driver in the vehicle during the cut-in cut-out event. The profile may define rules to operate the vehicle in ACC to speed up or slow down the vehicle during a future cut-in cut-out event. The processor may receive, from the adaptive cruise control system, the profile at the vehicle. The processor may identify the future cut-in cut-out event when the vehicle is operating in ACC and an event is within a threshold value of the cut-in cut-out event. The processor may apply rules defined in the profile to correspond with the observed driving style of the driver.

In some examples, applying the rules defined in the profile include slowing down the vehicle to widen a gap between the vehicle and a second vehicle in front of the vehicle.

In some examples, applying the rules defined in the profile include increasing speed of the vehicle to close a gap between the vehicle and a second vehicle in front of the vehicle.

In some examples, the machine learning model comprises an event classifier that detects events while ACC is activated, a filtering module that separates cut-in cut-out events from other events while ACC is activated, and an acceleration and braking pattern classifier.

In some examples, metadata is generated and transmitted with the event data, and the metadata identifies a location where the event data is captured.

In some examples, metadata is generated and transmitted with the event data, and the metadata identifies a number of passengers that are traveling in the vehicle with the driver when the event data is captured.

In some examples, the vehicle comprises weight sensors incorporated with seats of the vehicle or image sensors to detect passengers in the vehicle in addition to the driver, and incorporates the passengers with the driver with adjusting the profile.

In some examples, metadata is generated and transmitted with the event data, and the metadata comprises location information collected from a global positioning system (GPS) sensor or other location-based sensor.

In some examples, metadata is generated and transmitted with the event data, and the metadata identifies a type of sensor that is generating information that is stored and transmitted as the metadata.

In some examples, the adaptive cruise control system is located remote from the vehicle in a cloud-based server.

In some examples, the adaptive cruise control system is located locally at the vehicle to update the machine learning model and the profile for future use.

In some examples, the ACC circuit is part of an advanced driver-assistance system (ADAS).

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
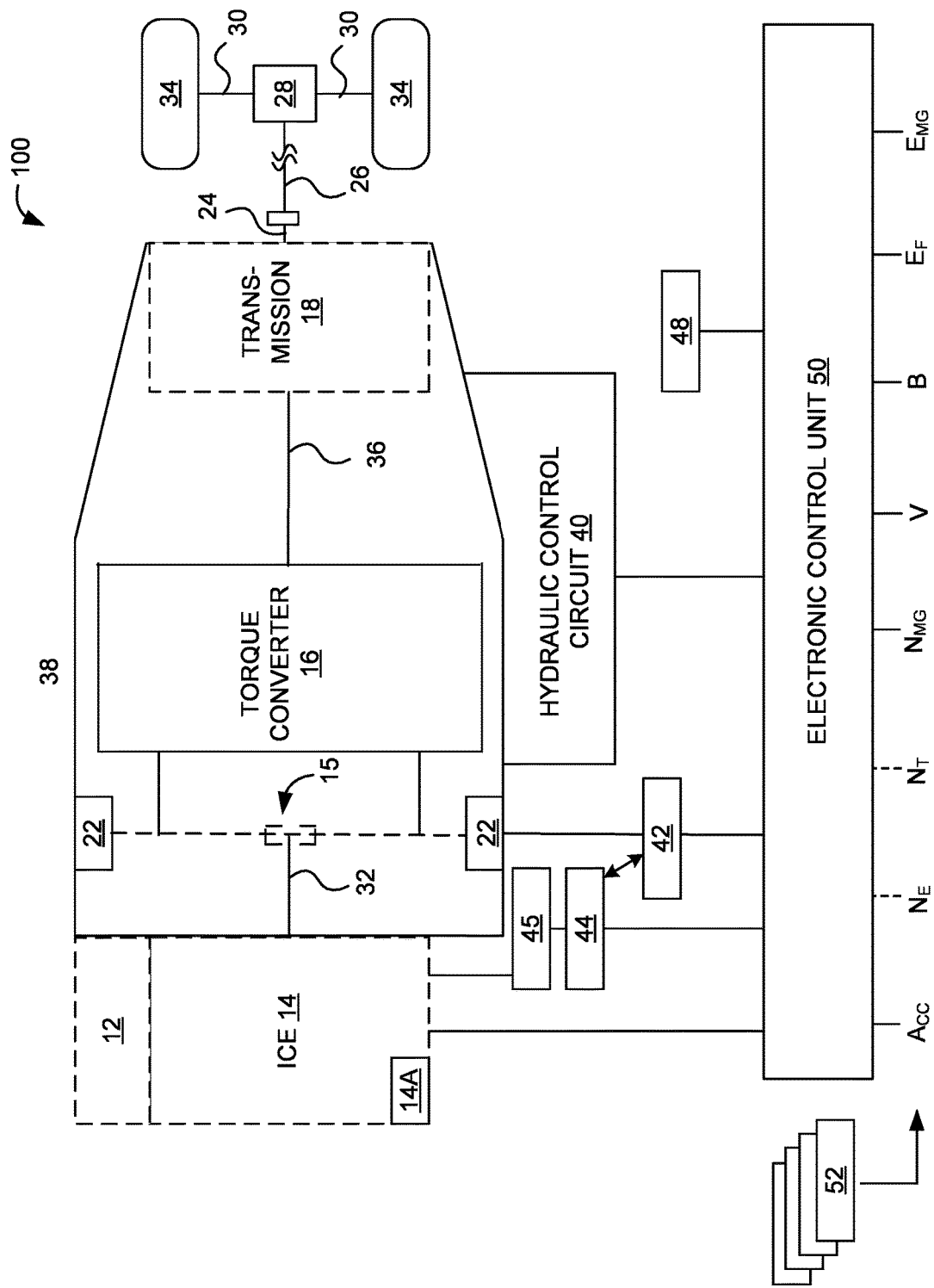
FIG. 1 is a schematic representation of an example vehicle with which some embodiments of the systems and methods disclosed herein may be implemented.

The figures are not exhaustive and do not limit the present disclosure to the precise form disclosed.

DETAILED DESCRIPTION

Some motor vehicles have improved traditional cruise control functionality with the use of adaptive cruise control (ACC). ACC can increase or decrease the speed of the vehicle based data received from sensors incorporated with the vehicle. The sensors may comprise cameras, lasers, radar equipment, infrared sensors and other sensors in order to measure the distance between the ego vehicle and other vehicles on the roadway. When the ego vehicle is within a predetermined distance to a second vehicle in front of it, the sensors may detect the distance between the vehicles that is within a threshold value and the ACC component may activate/alert the driver to slow down and the ACC component may actively slow the vehicle down itself. The alert may comprise visual alerts such as flashing lights interior to the vehicle, an interface display that identifies the warning (e.g., "slow down" or an appropriate icon), an audible warning, or a tactile warning (e.g., vibrating the accelerator pedal). However, in each of these instances, the distance between the ego vehicle and the second vehicle is predetermined in order to initiate the alert to the driver. Instead, the driver of the ego vehicle may have different preferences to speed up or slow down than the predetermined threshold value.

In some instances, personalized adaptive cruise control (PACC) may be implemented. For example, the personalized adaptive cruise control system can learn driver behavior and adaptively control the vehicle based on the learned behavior rather than based on pre-programmed operations. Examples of learned behavior may include a driver's reactions to a cut-in or cut-out event, upcoming curve in the road or road hazard, weather event, or other trigger event that may cause the cruise control system to adapt to surroundings or the environment. For ease of understanding and to provide context in which embodiments may be disclosed, this disclosure describes various embodiments in terms of a cut in or cut out event as a triggering event. As such, cut in events and cut out events may correspond with triggering events. As will be apparent to one of ordinary skill in the art based on the teachings herein, the operation of these embodiments may be applied in other scenarios.

In cut-in events, the ego vehicle is operating with ACC activated, and a gap forms between the ego vehicle and a second vehicle in front of the ego vehicle. A third vehicle moves into the lane between the ego vehicle and the second vehicle, which may cause the ego vehicle ACC component to ease off the accelerator or apply the brakes (e.g., to widen the gap between the ego vehicle and the new third vehicle) in response to the cut-in event and increase the distance between the third vehicle and the ego vehicle which is less than the distance between the second vehicle (now in front of the third vehicle) and the ego vehicle. In some cases, the driver's preference may not match the change in acceleration initiated by the ACC component, and the driver may choose to deactivate the ACC component and resume driving without the ACC activated which may be a technical limitation with traditional adaptive cruise control systems.

In cut-out events, the ego vehicle is operating with ACC activated and the second vehicle in front of the ego vehicle moves out of the lane, leaving a large gap between the ego vehicle and the vehicle in front of it. The ego vehicle ACC component may accelerate the vehicle to speed up and close the newly available space in response to the cut-out event (e.g., to close the gap so a third vehicle may cut-in front of the ego vehicle). In some cases, the acceleration may be stronger than the vehicle operator might otherwise prefer and, as discussed with cut-in events, the driver may choose to deactivate the ACC component and resume driving without the ACC activated.

The learned behavior by the driver of the ego vehicle during a trigger event, such as a cut-in or cut-out event, may be determined using reinforcement learning or other machine learning model, where the driver's demonstrated driving data is matched to a profile or otherwise used to train the model to best characterize the observed driving style. In some examples, the driver has its own personal profile of driving characteristics. Embodiments of the systems can further personalize the profile of the driver while using PACC based on event data, gap distance, and other characteristics of the environment.

Embodiments of the systems and methods disclosed herein can capture event data comprising driver operations and traffic events associated with a cut-in event, cut-out event, or other ACC trigger event. The vehicle or other device may also collect or generate metadata associated with the event data. The metadata and event data may be transmitted to an adaptive cruise control system that uses the metadata and the event data as input to a machine learning model. Output of the machine learning model may update a profile for the driver of the vehicle that operates the vehicle in ACC in accordance with the metadata and event data. The profile may be received at the vehicle from the adaptive cruise control system and, when the vehicle is operating in ACC and an event is within a threshold value of cut-in event, cut-out event, or other ACC trigger event, the vehicle may apply rules defined in the profile. With an updated profile corresponding closer to the preferences of the driver, the improved learning process may help prevent deactivation of ACC at the vehicle.

As an illustrative example, drivers responses to ACC trigger events such as cut-in and cut-out events may vary, with millions of drivers having slight, moderate or significant differences in behavior. Some may try to block the cut-in, some may get upset and exhibit road rage. In another example, there are merging freeways, and the merging cars may want to get into the fast lane as soon as possible and cross several lanes of traffic in front of other vehicles. That may create instances where other vehicles may need to allow a cut-in because one has to constantly brake and even the ACC has to constantly be on alert for cut-in events. These cut-in events may cause the driver to feel anxious or be annoyed by or have lower confidence in the ACC. In such cases, some drivers may narrow the gap between itself and the vehicle in front of it so that other cars are unable to cut-in at higher speeds. Another driver may decide to change to a slower lane and avoid the situation of constant cut-ins. In some embodiments of the disclosure, the profile for the personalized ACC may incorporate the personalized behavior of each driver, the personalized speed of the driver in a cut-in event, and the time range that the driver implements slowing down (e.g., to allow a cut-in) or speeding up to close the gap (e.g., to not allow a cut-in).

As another illustrative example, when an ego car is driving in traffic at 45 miles per hour (mph) and the car in front of the ego vehicle performs a cut-out event, the ego vehicle may accelerate to close the gap. The ego vehicle may increase the speed from 45 mph to 65 mph to close the gap quicker while the vehicle is operating with ACC activated. When the driver does not want to speed up that quickly, the driver may press the brake pedal and deactivate the ACC to avoid the ego vehicle from increasing speed so quickly. In some embodiments of the disclosure, the profile may identify that the driver does not prefer to increase the speed of the vehicle so quickly, and instead increase the speed at a slower rate in response to a cut-out event.

As another illustrative example, the driver prefers activation of ACC in stop-and-go traffic, the profile for the driver can set a rule corresponding to the desired speed in the stop-and-go traffic. The traditional ACC setting may be 30 mph but in traffic, the traditional ACC setting may be set to 20 mph, irrespective of the driver's preference. Again, a cut-out event may cause the ego vehicle to suddenly accelerate and the driver, if uncomfortable with the acceleration, would deactivate the ACC. In some embodiments of the disclosure, the profile may identify that the driver does not prefer to increase the speed of the vehicle so quickly, and instead increase the speed at a slower rate in response to a cut-out event in the stop-and-go traffic.

In the case of the ACC slowing for curves in the road, some drivers may be uncomfortable and apply the brakes to slow more. Other drivers may press the accelerator, effectively overriding the ACC to maintain a higher level of speed through the curve. The curves in the road or other roadway conditions may correspond with the ACC trigger event. The driver's reactions to the trigger event and other information may be collected for the driver's profile and behavior of the PACC adjusted to account for the driver's preferences.

There are many such contexts where different drivers prefer different gaps, acceleration, braking, and other behavior in various situations. In some embodiments of the disclosure, the PACC rules may be personalized to the driver preferences or styles (e.g., based on the profile of the driver) so that vehicle operators and passengers have a better experience and so that ACC trigger events are less likely to lead to deactivation of the ACC.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for a trigger event (e.g., cut-in cut-out event, etc.) personalized adaptive cruise control (P-ACC) can be implemented in other types of vehicle including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 100 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 100 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
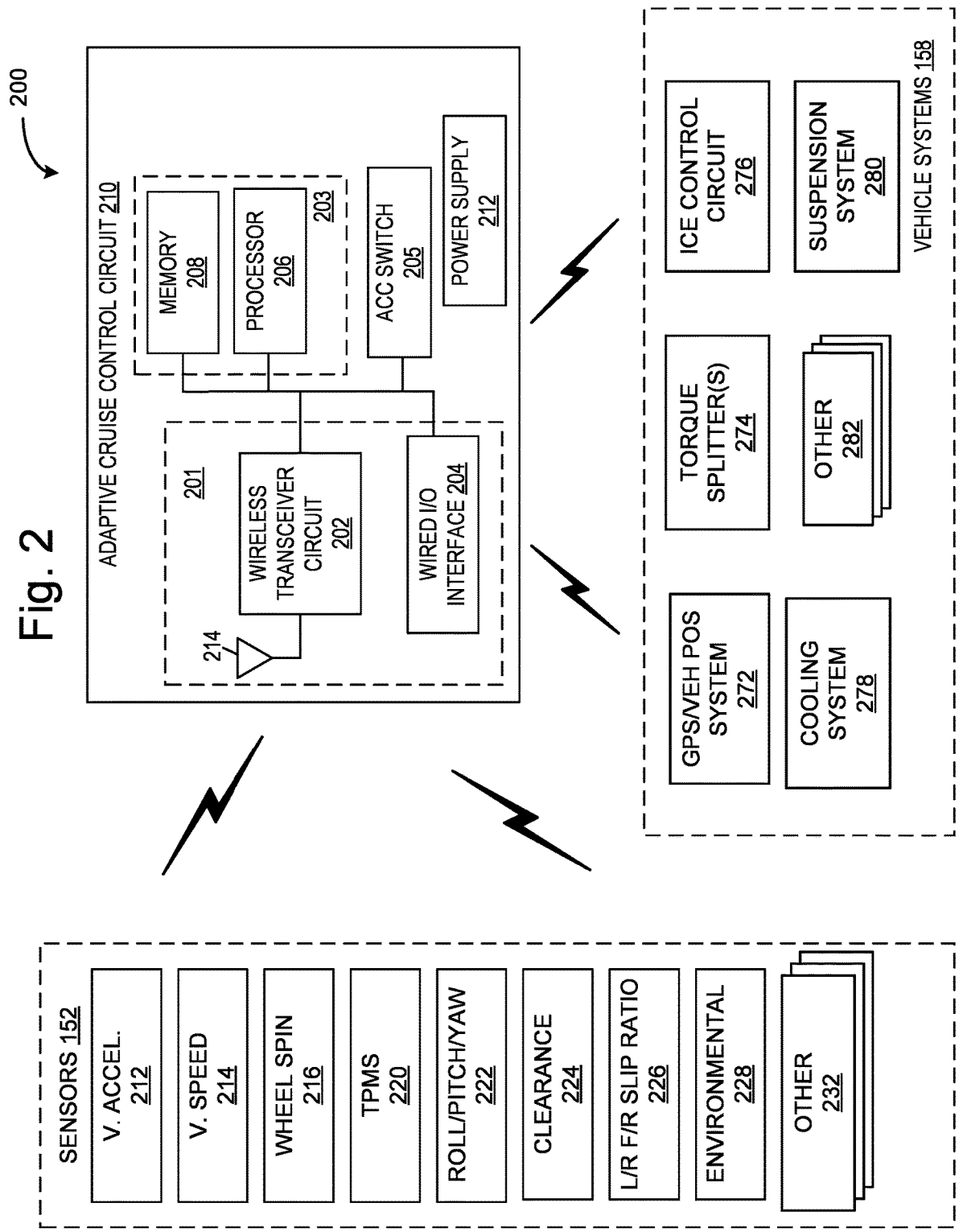
FIG. 2 illustrates an example architecture for implementing adaptive cruise control (ACC) in accordance with some embodiments of the systems and methods described herein.

FIG. 2 illustrates an example architecture for implementing adaptive cruise control (ACC) in accordance with some embodiments of the systems and methods described herein. In example 200, illustrative vehicle components are provided including adaptive cruise control circuit 210, a plurality of sensors 152, and a plurality of vehicle systems 158. Sensors 152 and vehicle systems 158 can communicate with adaptive cruise control circuit 210 via a wired or wireless communication interface. Although sensors 152 and vehicle systems 158 are depicted as communicating with adaptive cruise control circuit 210, they can also communicate with each other as well as with other vehicle systems. Adaptive cruise control circuit 210 can be implemented as an ECU or as part of an ECU such as, for example electronic control unit 50. In other embodiments, adaptive cruise control circuit 210 can be implemented independently of the ECU.

Adaptive cruise control circuit 210 in this example includes a communication circuit 201, a decision circuit 203 (including a processor 206 and memory 208 in this example) and a power supply 212. Components of adaptive cruise control circuit 210 are illustrated as communicating with each other via a data bus, although other communication in interfaces can be included. Adaptive cruise control circuit 210 in this example also includes a manual assist switch 205 that can be operated by the driver to manually select the ACC mode. Illustrative examples of manual assist switch 205 are provided in FIG. 4.

Processor 206 can include one or more GPUs, CPUs, microprocessors, or any other suitable processing system. Processor 206 may include a single core or multicore processors. Memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to adaptive cruise control circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a adaptive cruise control circuit 210.

Communication circuit 201 either or both a wireless transceiver circuit 202 with an associated antenna 205 and a wired I/O interface 204 with an associated hardwired data port (not illustrated). As this example illustrates, communications with adaptive cruise control circuit 210 can include either or both wired and wireless communications circuits 201. Wireless transceiver circuit 202 can include a transmitter and a receiver (not shown) to allow wireless communications via any of a number of communication protocols such as, for example, Wifi, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by adaptive cruise control circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 100 with which adaptive cruise control circuit 210 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Some sensors 152 may comprise cameras, lasers, and radar equipment in order to measure the distance between the ego vehicle and other vehicles on the roadway. In some examples, sensors 152 may comprise weight sensors incorporated with the seats of the vehicle or camera/image sensors to detect passengers in the vehicle in addition to the driver. Additional sensors 232 can also be included as may be appropriate for a given implementation of the adaptive cruise control (ACC) system.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, or an adjustable-damping suspension system; and other vehicle systems 282.

During operation, adaptive cruise control circuit 210 can receive information from various vehicle sensors to determine whether the adaptive cruise control should be activated. Also, the driver may manually activate the adaptive cruise control by operating ACC switch 205. Communication circuit 201 can be used to transmit and receive information between adaptive cruise control circuit 210 and sensors 152, and adaptive cruise control circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate the assist mode. Additionally, communication circuit 201 can be used to send an activation signal or other activation information to various vehicle systems 158 as part of entering the assist mode. For example, as described in more detail below, communication circuit 201 can be used to send signals to one or more of: torque splitters 274 to control front/rear torque split and left/right torque split; motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152. Examples of this are described in more detail below.

Figure 3:
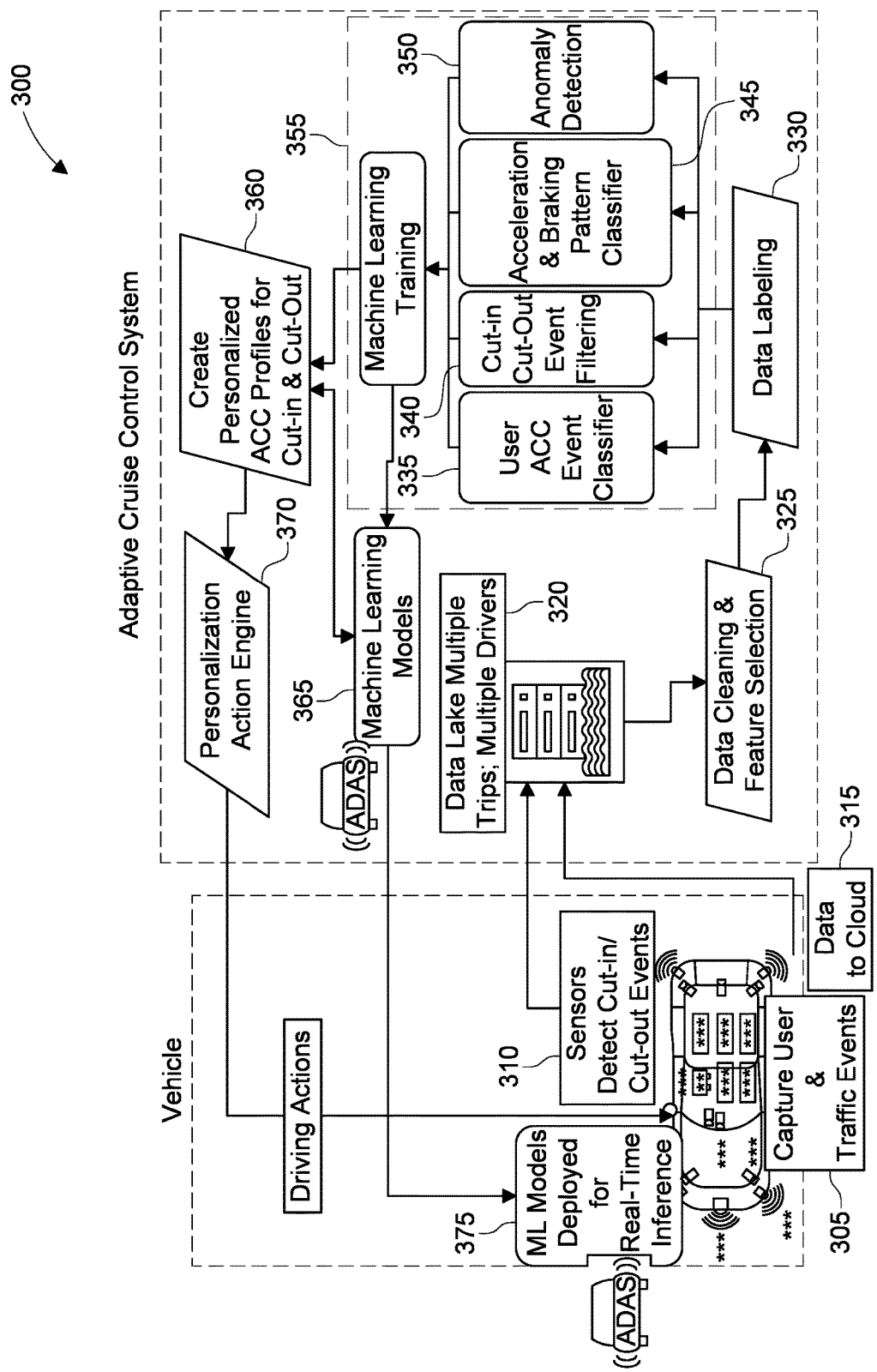
FIG. 3 is an illustrative process for implementing adaptive cruise control (ACC) in accordance with some embodiments of the systems and methods described herein.

FIG. 3 is an illustrative process for implementing adaptive cruise control (ACC) in accordance with some embodiments of the systems and methods described herein. In example 300, a vehicle that implements adaptive cruise control (ACC) and an adaptive cruise control system for enabling the ACC are illustrated. In some examples, the ACC is part of an advanced driver-assistance system (ADAS). In some examples, the adaptive cruise control system is stored in a cloud-based architecture, although other implementations are available without diverting from the scope of the disclosure.

For example, the ADAS may receive the personalized adaptive cruise control profile from the adaptive cruise control system and use it to instruct the vehicle to implement particular operations in response to receiving instructions to comply with the profile. The ADAS may provide haptic, audible, or visual feedback to the driver to continue operations of the vehicle. In some examples, the ADAS may operate the vehicle under the supervision of the driver. In some examples, the ADAS may take over control of the vehicle from the driver.

At block 305, the vehicle may include a plurality of sensors to determine characteristics about the driver of the vehicle and traffic events on the roadway. In some examples, the driver data and traffic events may be stored as event data.

Event data may comprise any detectable attributes of the environment surrounding or within the vehicle, which can be captured by the vehicle itself or another device. For example, the vehicle may include an image sensor (e.g., associated with a camera or with LIDAR) to detect light/darkness internal and external to the vehicle, a number of passengers in the vehicle, a number of vehicles surrounding the ego vehicle (e.g., to detect light or heavy traffic), recognizable landmarks (e.g., to detect urban or rural settings), paved or unpaved roadways, or other images that may be captured by the image sensors associated with the vehicle. In another example, the vehicle may comprise weight sensors in the seats of the vehicle to detect passengers in addition to the driver in the vehicle. In another example, the vehicle may comprise sensors to detect weather (e.g., sunny, rainy, 72 degrees, etc.) or receive weather reports from a third party source.

In some examples, the data may comprise metadata that is collected or generated with the event data. The metadata may identify, for example, location information collected from a global positioning system (GPS) sensor or other location-based sensor. In some examples, the metadata may identify the type of sensor that is generating the information that is stored and transmitted as metadata.

In some examples, the detection of a ACC trigger event, such as a cut-in or a cut-out event, may trigger storing of the event data. For example, the vehicle may have previously received a trained machine learning model that can categorize and detect a cut-in or a cut-out event. The vehicle may receive sensor input to provide to the machine learning model. The sensor input and other relevant information, along with the driver action and traffic event information, are captured and stored.

At block 310, the vehicle may include a plurality of sensors facing outside the vehicle (e.g., forward-, backward-, side-, downward-looking sensors, etc.) to determine characteristics about the environment, ego vehicle, and other vehicles on the roadway. The vehicle may also include sensors to detect vehicle and environmental parameters. For example, illustrated in FIG. 2, sensors 152 include vehicle acceleration sensors 212, vehicle speed sensors 214, wheel-spin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions).

At block 315, the event data is sent to the adaptive cruise control system, including driver data and traffic events determined at block 305 and sensor data determined at block 310.

At block 320, the data store may receive multiple transmissions of data from multiple vehicles and drivers. In some examples, multiple or all of these vehicles may comprise adaptive cruise control circuit 210 illustrated in FIG. 2.

At block 325, the process may initiate data cleaning and feature selection. For example, data cleaning may identify and correct errors, inconsistencies, and inaccuracies in the transmissions of data from multiple vehicles and drivers. The data cleaning may comprise, for example, identifying missing data points. Once the missing data points are identified, the process may impute values or remove instances of the data transmitted from the vehicle sensors with missing information. The data cleaning may remove duplicate records to help avoid redundancy and potential biases. The data cleaning may detect outliers in the data, which can be removed or transmitted to a separate process to determine whether the outliers are accurate and should be used to retrain the machine learning model to incorporate the outlier. The data cleaning may initiate standardizing or normalizing numerical features of the data. The data cleaning process may remove typos, correct formatting issues, or remove/replace conflicting information. The process may also initiate feature selection to determine a subset of relevant features from a larger set of features in a dataset. The feature selection may reduce the dimensionality of the data while retaining important information for model training.

At block 330, the process may initiate data labeling to help improve the training process for a supervised machine learning model. For example, the data labels can map correlations between input features and the corresponding output labels. The labeled data can be provided as a training data set for the machine learning model.

At block 355, the process may provide the cleaned and labeled to a multi-step machine learning training pipeline. The machine learning algorithm clusters events and acceleration and braking behavior and filters out those for the cut-in and cut-out events. The multi-step machine learning training pipeline may comprise, for example, driver ACC event classifier 335, cut-in cut-out event filtering 340, acceleration and breaking pattern classifier 345, and anomaly detection 350.

Driver ACC event classifier 335 is configured to classify an event (e.g., with a start and end) based on a classification of the event by a trained, supervised machine learning model. For example, event data and metadata is received by driver ACC event classifier 335 and the output of the classifier is a label or other classification of the type of event based on a classification score associated with the event. In this sense, events that are classified with the same label (e.g., over a threshold value) can be clustered with other similar events.

Cut-in cut-out event filtering 340 is configured to determine the events that have been classified as corresponding with a cut-in event or an event corresponding with a cut-out event from the labels generated by driver ACC event classifier 335. These events may be filtered and separately analyzed as part of the machine learning model training in generating a profile that models the driver's reactions to cut-in and cut-out events (e.g., speed up, slow down, etc.) with acceleration and breaking pattern classifier 345.

Acceleration and breaking pattern classifier 345 is configured to determine a pattern of vehicle operations that detect the driver's reactions in speeding up or slowing down the vehicle in response to particular event data, metadata, or other factors. As an illustrative example, the driver may allow vehicles to cut-in when other passengers are in the vehicle or the vehicle is in a rural area, yet may not allow vehicles to cut-in when the driver is on a highway traveling at least 60 mph. When the event data is detected, the driver may exhibit a pattern of speeding up to not allow the cut-in event (e.g., with a threshold amount of space between the ego vehicle and a second vehicle directly in front if it). An aggregation of data is correlated to the acceleration and breaking pattern for the driver.

Anomaly detection 350 is configured to detect a driver's behavior that deviates from the driver's standard behavior (e.g., reactions or operations defined or predicted in a corresponding profile). For instance, during a cut-in event, a driver might slow down. In an anomalous situation, the driver might react differently, like changing lanes or speeding up unexpectedly.

The anomalous behavior may be detected and aggregated by a counter. When the counter exceeds a predetermined threshold, the anomalous behavior may be used to update the profile of the driver as recurring/predicted behavior. The anomalous operations may be removed from the profile as anomalies and added to a set of predicted future actions by the driver. The anomalous behavior may remain as an anomaly until the counter meets or exceeds the threshold value.

In some examples, block 355 is configured to create a personalized ACC profile for cut-in and cut-out events that aggregates/combines the output from driver ACC event classifier 335, cut-in cut-out event filtering 340, acceleration and breaking pattern classifier 345, and anomaly detection 350. The combination of each of the events/characteristics of the driver of the vehicle, the vehicle itself, the environment surrounding the vehicle or internal to the vehicle, and other factors may be used to create the profile.

At block 360, a profile of personalized responses of the driver during cut-in and cut-out events is created. In some examples, the profile may identify a speed up or slow down action to perform by the vehicle when a set of characteristics are present in an environment, based on the driver's previous actions under similar settings.

At block 365, the profile of personalized responses of the driver during cut-in and cut-out events is sent to a data repository of machine learning models. The machine learning model at block 365 may train a model to provide generalized responses to triggering events and other environment scenarios. For example, the machine learning models may be used for ADAS for multiple vehicles in addition to the personalized profile for the ego vehicle.

At block 370, the profile of personalized responses of the driver during cut-in and cut-out events is sent to a personalization action engine. The machine learning models may be further tuned to be used for ADAS for a particular vehicle. As a comparison, block 365 can represent generalized machine learning models that handle event triggers, anomaly detection, and classification among other types of predictions, while block 370 may be tailored to a particular/individual drivers' preferences including gap maintenance, braking intensity, reaction time, etc.

At block 375, the profile of personalized responses of the driver may be used during future cut-in events, cut-out events, or other trigger events by the vehicle. Using the profile while the vehicle is in operation, the profile provides rules/instructions for the vehicle to take while it is operating in ACC, which may be implemented by the ADAS. For example, if the driver prefers a slower and faster acceleration, the rule will instruct the ACC/vehicle to determine the environmental factors and provide slower and faster acceleration while the ACC is activated. If the driver prefers not to allow vehicles that are predicted to cut-in, the profile sends action information to the ADAS system to close the gap. The driver can deactivate the ACC and stop implementation of these actions determined by the profile, which again are detected/stored and sent to the adaptive cruise control system for training.

For faster response and in vehicles with suitable compute power, the adaptive cruise control system can be implemented at the vehicle. In turn, the machine learning training can be performed locally at the vehicle and locally update the models and personalized profile for future use.

Figure 4:
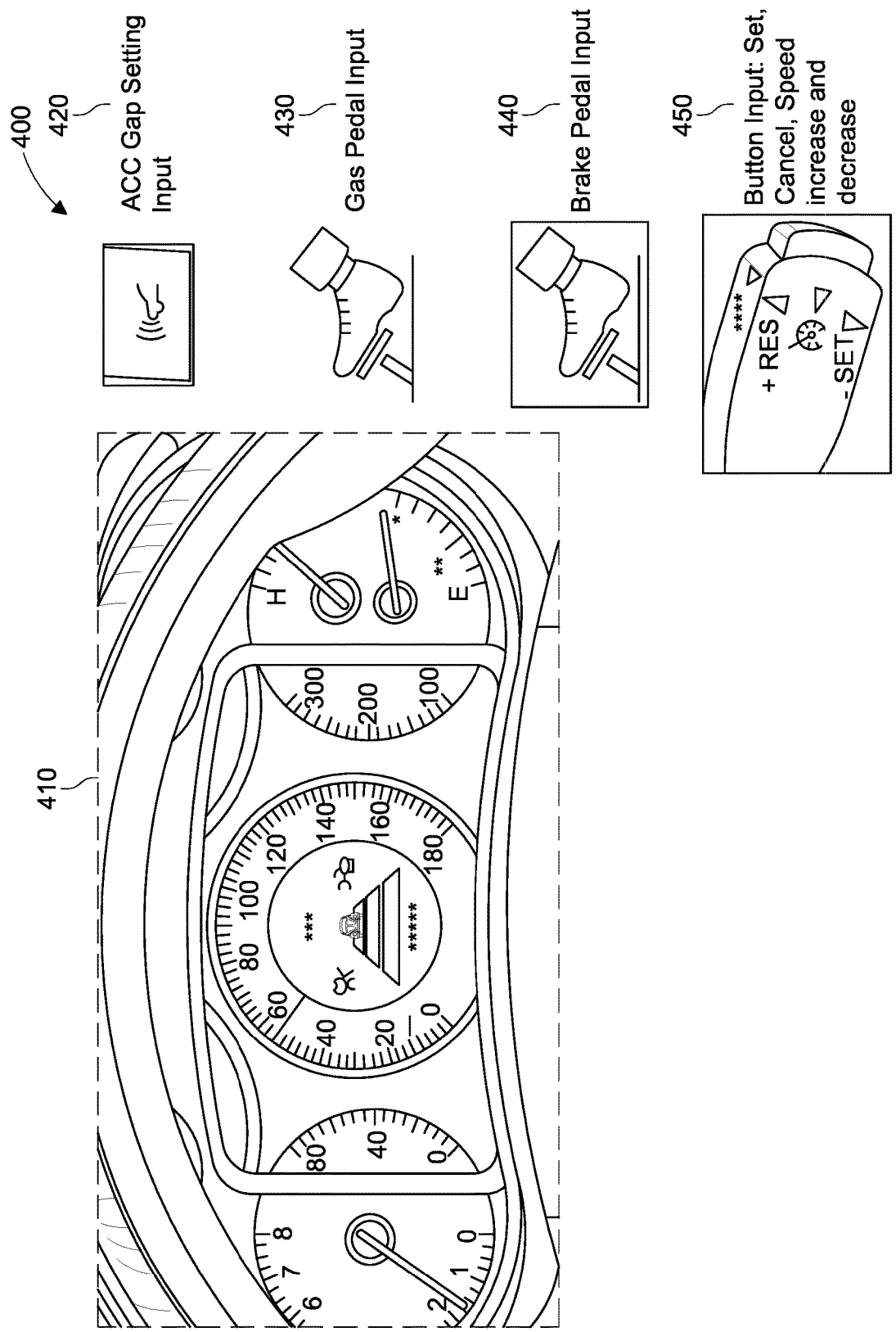
FIG. 4 illustrates examples of activating and deactivating adaptive cruise control (ACC) in accordance with some embodiments of the systems and methods described herein.

FIG. 4 illustrates examples of activating and deactivating adaptive cruise control (ACC) in accordance with some embodiments of the systems and methods described herein. In example 400, a driver of a vehicle may change the ACC setting in various ways. All of this information may be recorded in the data logger and sent to the adaptive cruise control system for analysis.

At block 410, an interface in a vehicle is illustrated. In this example, the interface is incorporated with the dashboard of the vehicle adjacent to the speed of the vehicle, RPMs, odometer, and other features of the vehicle. In various embodiments, the interface may be provided in various other ways such as, for example, in a settings menu or vehicle menu for vehicle systems (e.g., actuated via a head unit, central display, etc.), on the cruise control stalk, via buttons on the steering wheel or console, via voice prompts and so on.

At block 420, an ACC switch is illustrated. In this example, the ACC switch may be activated to set an input value for the ACC gap preference between the ego vehicle and a second vehicle directly in front of the ego vehicle. This may be preset by the factory or it may be a user selection based on AC input. The ego vehicle may measure the gap between the ego vehicle and a second vehicle. The second vehicle may be a measurable distance gap in front of ego vehicle during a cut-in or cut-out events.

At block 430, the gas pedal may be used to adjust the ACC setting. For example, the gas pedal may override the ACC setting to allow the vehicle to accelerate and then return back to the set speed, but not typically cancel the ACC activation. Depressing the brake pedal, in some cases, will cancel the ACC activation. In some cases, the ACC activation may be set and cancelled via a dedicated interface, such as steering wheel buttons or a stalk.

In some examples, the gas pedal is used to change the ACC setting from a first speed to a second speed. When the gas pedal is released, the vehicle may return to the pre-set value when ACC was initially activated or remain at the current value when the gas pedal is released. The speed that the vehicle was traveling when the ACC switch was activated, distance between vehicles, and other event data may be determined and transmitted to the adaptive cruise control system (e.g., adaptive cruise control system in FIG. 3).

At block 440, the brake pedal may be used to deactivate the ACC. In this example, the brake pedal deactivates the ACC at a first speed and can immediate press the gas pedal to increase the speed while the ACC is deactivated or continue to press the brake pedal to slow down the vehicle. The driver may reactivate ACC using ACC switch (at block 420 or block 450). The speed that the vehicle was traveling when the brake pedal was pressed, distance between vehicles, and other event data may be determined and transmitted to the adaptive cruise control system (e.g., adaptive cruise control system in FIG. 3).

At block 450, an ACC switch is illustrated. In this example, the ACC switch is a button attached to the steering wheel column and may activate ACC by pressing the button. In this example, the ACC switch may be activated to set an input value for the ACC gap preference between the ego vehicle and a second vehicle directly in front of the ego vehicle. The second vehicle may be a vehicle that is used to measure the gap in front of ego vehicle during a cut-in or cut-out event. The speed that the vehicle was traveling when the ACC switch was activated, distance between vehicles, and other event data may be determined and transmitted to the adaptive cruise control system (e.g., adaptive cruise control system in FIG. 3).

Figure 5:
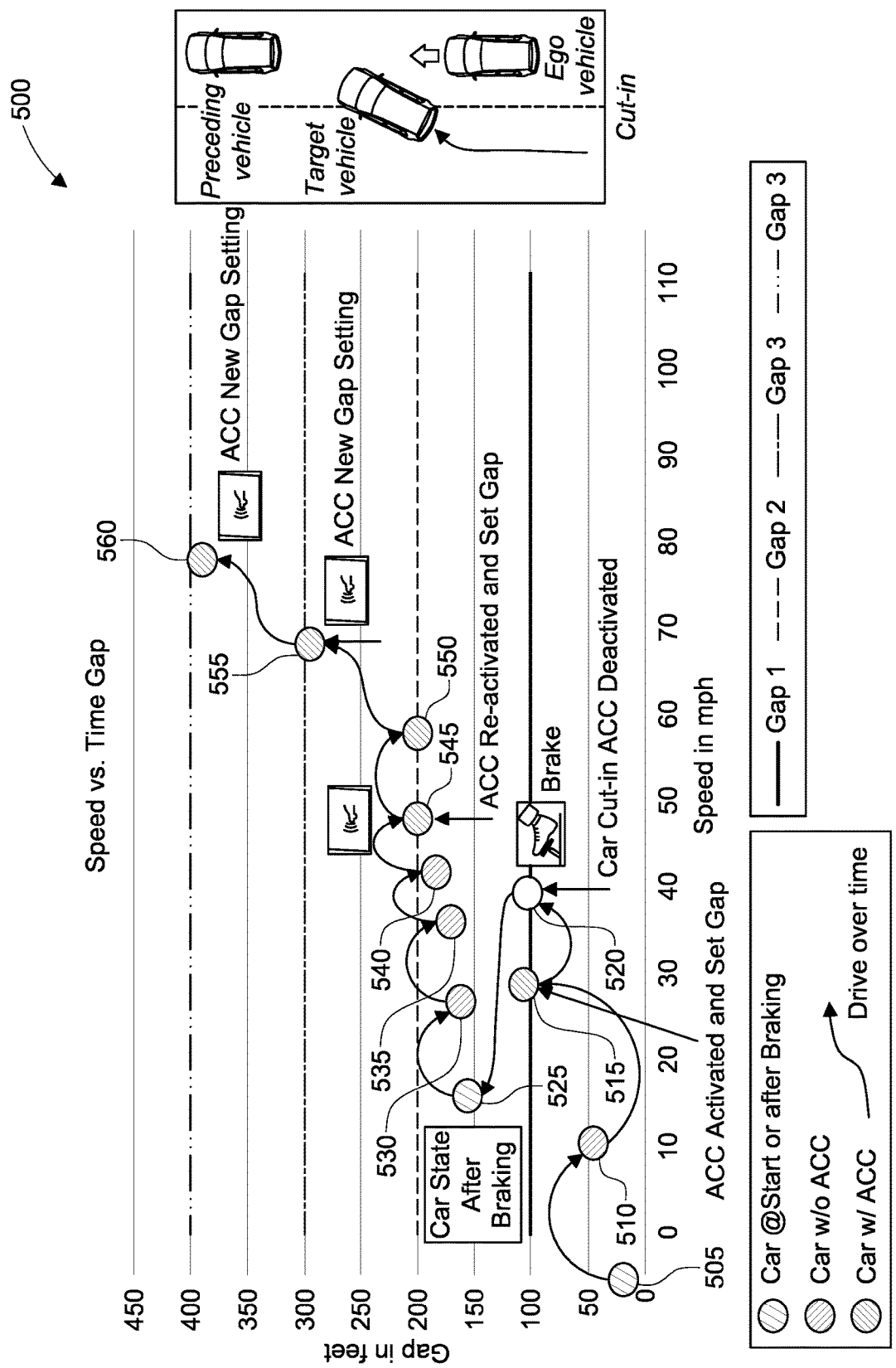
FIG. 5 illustrates a cut-in event in accordance with some embodiments of the systems and methods described herein.

FIG. 5 illustrates a cut-in event in accordance with some embodiments of the systems and methods described herein. In example 500, personalized behavior of the driver of a vehicle is shown, including deactivation and reactivation of the ACC due to a second vehicle performing a "cut-in" in front of the ego vehicle. For example, the ADAS system may not recognize the cut-in fast enough, so the driver presses the brake pedal and deactivates the ACC. Then, the driver continues to accelerate and reactivates the ACC and sets a new, longer gap. As the speed increases, the driver may increase the gap even more.

In some embodiments of the disclosure, the series of events illustrated in example 500 may be used to train a machine learning model to generate a profile for the driver. For example, the event data and metadata that is generated at the time of these events may be correlated to the driver's reaction to the cut-in event illustrated in example 500, to create a profile for the vehicle. When the event data and metadata is detected at a second time that is similar within a threshold value of the these events, the profile may instruct the vehicle to operate in accordance with the actions that the driver previously took under similar circumstances.

As illustrated, a first set of events may correspond with a time frame up to the time that the driver of the vehicle activates ACC. At block 505, the ego vehicle is operating at 0 mph speed with a 0 foot gap in front of the vehicle. At block 510, the ego vehicle is operating at 10 mph speed with a 50 foot gap in front of the vehicle. At block 515, the ego vehicle is operating at 30 mph speed with a 100 foot gap in front of the vehicle. ACC is activated using one of the interfaces or buttons illustrated in FIG. 4.

A second set of events may correspond with a time frame while the vehicle is operating with ACC activated and reacting to a cut-in event. At block 520, the ego vehicle is operating at 40 mph speed with a 100 foot gap in front of the vehicle. The brake pedal is pressed, which slows the vehicle. The event data associated with the brake pedal and deactivation of the ACC is generated and stored, including the speed of the vehicle, driver/passenger characteristics, gap between the ego vehicle and other vehicles, location/time of the event, and other event data discussed herein. At block 525, the ego vehicle is operating at 15 mph speed with a 150 foot gap in front of the vehicle, which corresponds with the vehicle slowing while ACC is deactivated.

A third set of events may correspond with the vehicle speeding up and reactivating ACC. At block 530, the ego vehicle is operating at 30 mph speed with a 160 foot gap in front of the vehicle. At block 535, the ego vehicle is operating at 38 mph speed with a 170 foot gap in front of the vehicle. At block 540, the ego vehicle is operating at 45 mph speed with a 180 foot gap in front of the vehicle. At block 545, the ego vehicle is operating at 50 mph speed with a 200 foot gap in front of the vehicle. ACC is activated using one of the interfaces or buttons illustrated in FIG. 4. The event data associated with the reactivation of the ACC is generated and stored, as discussed herein.

A fourth set of events may correspond with increasing the gap between the ego vehicle and a second vehicle while ACC is active, and also detected an increased gap distance corresponding with an increased speed of the vehicle. At block 550, the ego vehicle is operating at 60 mph speed with a 200 foot gap in front of the vehicle. At block 555, the ego vehicle is operating at 70 mph speed with a 300 foot gap in front of the vehicle. At block 560, the ego vehicle is operating at 80 mph speed with a 400 foot gap in front of the vehicle.

Figure 6:
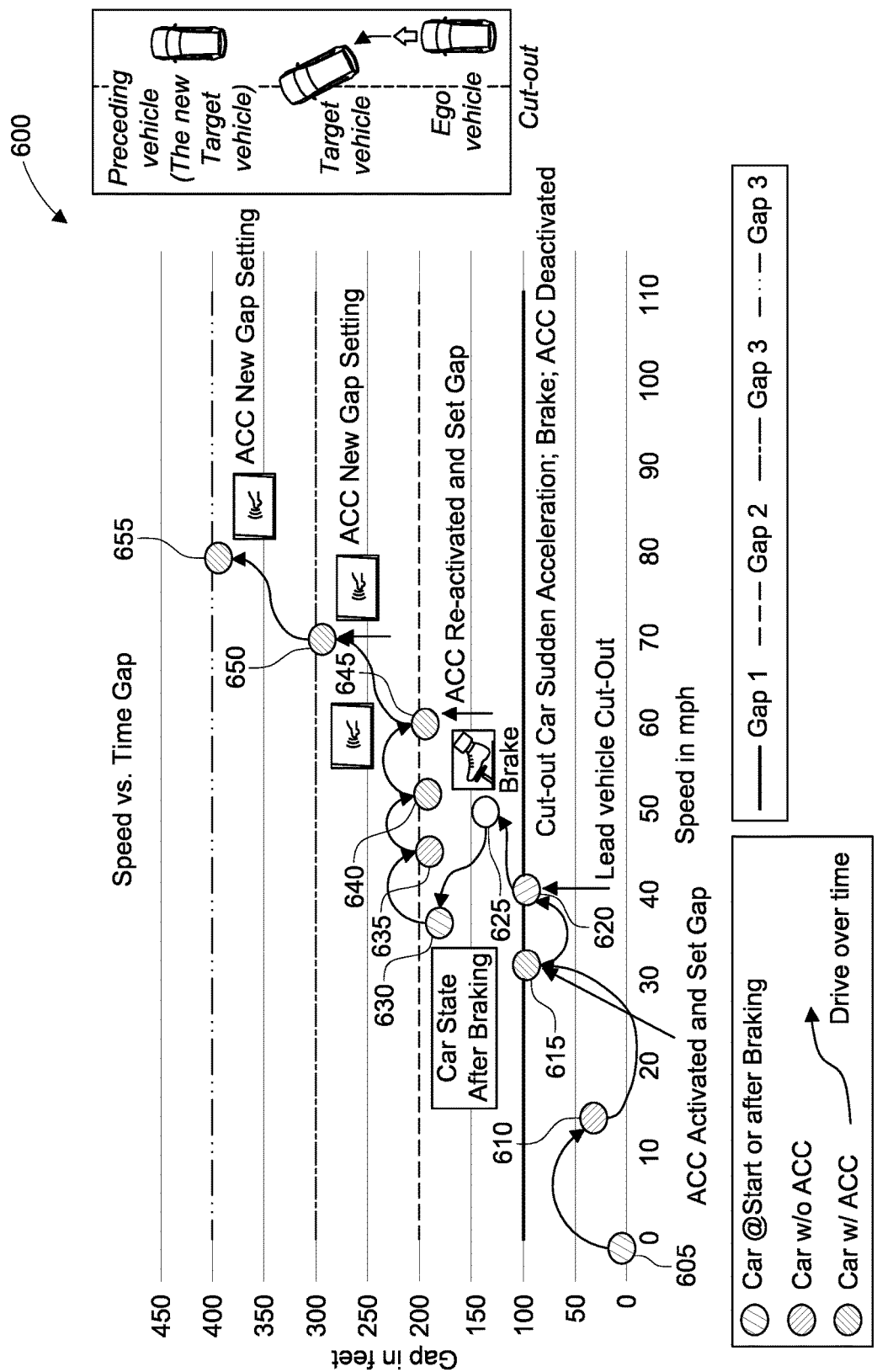
FIG. 6 illustrates a cut-out event in accordance with some embodiments of the systems and methods described herein.

FIG. 6 illustrates a cut-out event in accordance with some embodiments of the systems and methods described herein. In example 600, personalized behavior of the driver of a vehicle is shown, including deactivation and reactivation of the ACC due to a cut-out of a second vehicle in front of the ego vehicle. For example, the car suddenly accelerates and the driver has to brake and deactivate the ACC. Then, the driver continues to accelerate and reactivates the ACC and sets a new, longer gap. As the speed increases, the driver may increase the gap even more.

In some embodiments of the disclosure, the series of events illustrated in example 600 may be used to train a machine learning model to generate a profile for the driver. For example, the event data and metadata that is generated at the time of these events may be correlated to the driver's reaction to the cut-out event illustrated in example 600, to create a profile for the vehicle. When the event data and metadata is detected at a second time that is similar within a threshold value of the these events, the profile may instruct the vehicle to operate in accordance with the actions that the driver previously took under similar circumstances.

As illustrated, a first set of events may correspond with a time frame up to the time that the driver of the vehicle activates ACC. At block 605, the ego vehicle is operating at 0 mph speed with a 0 foot gap in front of the vehicle. At block 610, the ego vehicle is operating at 15 mph speed with a 40 foot gap in front of the vehicle. At block 615, the ego vehicle is operating at 30 mph speed with a 100 foot gap in front of the vehicle. ACC is activated using one of the interfaces or buttons illustrated in FIG. 4.

A second set of events may correspond with a time frame while the vehicle is operating with ACC activated and reacting to a cut-out event. At block 620, the ego vehicle is operating at 40 mph speed with a 100 foot gap in front of the vehicle. The second vehicle in front of ego vehicle initiates a cut-out operation. At block 625, the ego vehicle is operating at 50 mph speed with a 140 foot gap in front of the vehicle. The brake pedal is pressed, which slows the vehicle. The event data associated with the brake pedal and deactivation of the ACC is generated and stored, including the speed of the vehicle, driver/passenger characteristics, gap between the ego vehicle and other vehicles, location/time of the event, and other event data discussed herein. At block 630, the ego vehicle is operating at 38 mph speed with a 180 foot gap in front of the vehicle, which corresponds with the vehicle slowing while ACC is deactivated.

A third set of events may correspond with the vehicle speeding up and reactivating ACC. At block 635, the ego vehicle is operating at 45 mph speed with a 190 foot gap in front of the vehicle. At block 640, the ego vehicle is operating at 52 mph speed with a 190 foot gap in front of the vehicle. At block 645, the ego vehicle is operating at 60 mph speed with a 190 foot gap in front of the vehicle. ACC is activated using one of the interfaces or buttons illustrated in FIG. 4. The event data associated with the reactivation of the ACC is generated and stored, as discussed herein.

A fourth set of events may correspond with increasing the gap between the ego vehicle and a second vehicle while ACC is active, and also detected an increased gap distance corresponding with an increased speed of the vehicle. At block 650, the ego vehicle is operating at 70 mph speed with a 300 foot gap in front of the vehicle. At block 655, the ego vehicle is operating at 80 mph speed with a 400 foot gap in front of the vehicle.

Figure 7:
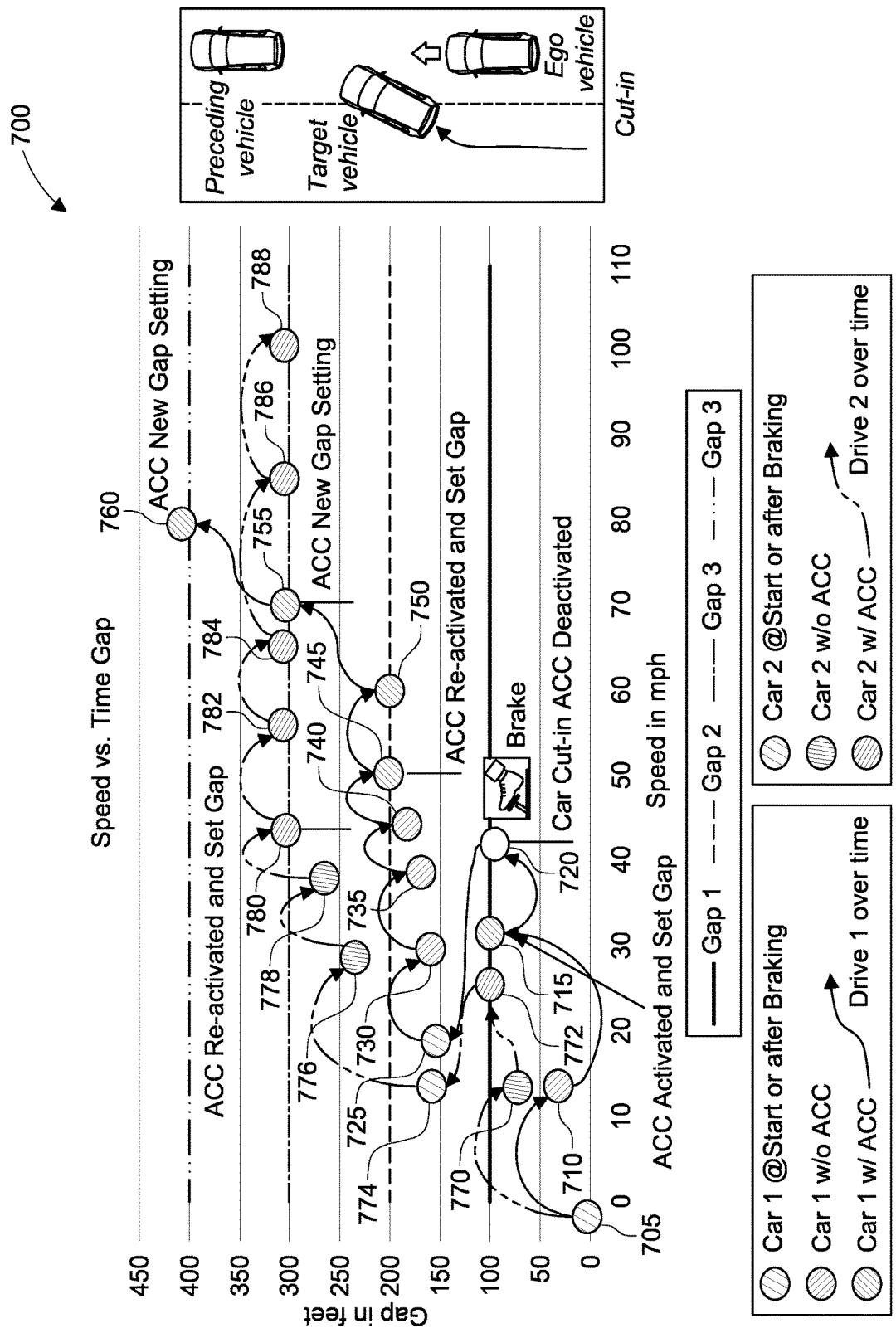
FIG. 7 illustrates two vehicle driver profiles in accordance with some embodiments of the systems and methods described herein.

FIG. 7 illustrates two vehicle driver profiles in accordance with some embodiments of the systems and methods described herein. In example 700, personalized profiles of two different drivers and vehicles are shown. The different drivers have different deceleration and ACC usage. The same is true for cut-outs. These profiles are then stored in the adaptive cruise control system and in each of the ego vehicle and the second vehicle.

For a first driver, the vehicle encounters a cut-in event and accelerates with an adjusted gap setting after the cut-in event. At block 705, both the ego vehicle and the second vehicle are operating at 0 mph speed with a 0 foot gap in front of the vehicle. At block 710, the ego vehicle is operating at 15 mph speed with a 40 foot gap in front of the vehicle. At block 715, the ego vehicle is operating at 30 mph speed with a 100 foot gap in front of the vehicle. ACC is activated and a gap distance is set. At block 720, the ego vehicle is operating at 42 mph speed with a 100 foot gap in front of the vehicle. The cut-in event is detected and ACC is deactivated using the brake pedal. At block 725, the ego vehicle is operating at 20 mph speed with a 150 foot gap in front of the vehicle. The vehicle decelerates after braking. At block 730, the ego vehicle is operating at 30 mph speed with a 155 foot gap in front of the vehicle. At block 735, the ego vehicle is operating at 40 mph speed with a 175 foot gap in front of the vehicle. At block 740, the ego vehicle is operating at 45 mph speed with a 190 foot gap in front of the vehicle. At block 745, the ego vehicle is operating at 50 mph speed with a 200 foot gap in front of the vehicle. ACC is reactivated and the gap distance is set. At block 750, the ego vehicle is operating at 60 mph speed with a 200 foot gap in front of the vehicle. At block 755, the ego vehicle is operating at 70 mph speed with a 300 foot gap in front of the vehicle. ACC is updated with a new gap distance setting. At block 760, the ego vehicle is operating at 80 mph speed with a 400 foot gap in front of the vehicle. ACC is updated with another new gap distance setting.

In comparison, a second driver/vehicle also encounters a cut-in event and accelerates with an adjusted gap setting after the cut-in event. At block 770, the second vehicle is operating at 15 mph speed with a 75 foot gap in front of the vehicle. At block 772, the second vehicle is operating at 25 mph speed with a 100 foot gap in front of the vehicle. The cut-in event is detected and ACC is deactivated using the brake pedal. At block 774, the second vehicle is operating at 15 mph speed with a 160 foot gap in front of the vehicle. At block 776, the second vehicle is operating at 30 mph speed with a 240 foot gap in front of the vehicle. At block 778, the second vehicle is operating at 40 mph speed with a 260 foot gap in front of the vehicle. At block 780, the second vehicle is operating at 45 mph speed with a 300 foot gap in front of the vehicle. ACC is reactivated and the gap distance is set. At block 782, the second vehicle is operating at 58 mph speed with a 310 foot gap in front of the vehicle. At block 784, the second vehicle is operating at 65 mph speed with a 310 foot gap in front of the vehicle. At block 786, the second vehicle is operating at 85 mph speed with a 310 foot gap in front of the vehicle. At block 788, the second vehicle is operating at 100 mph speed with a 310 foot gap in front of the vehicle.

Figure 8:
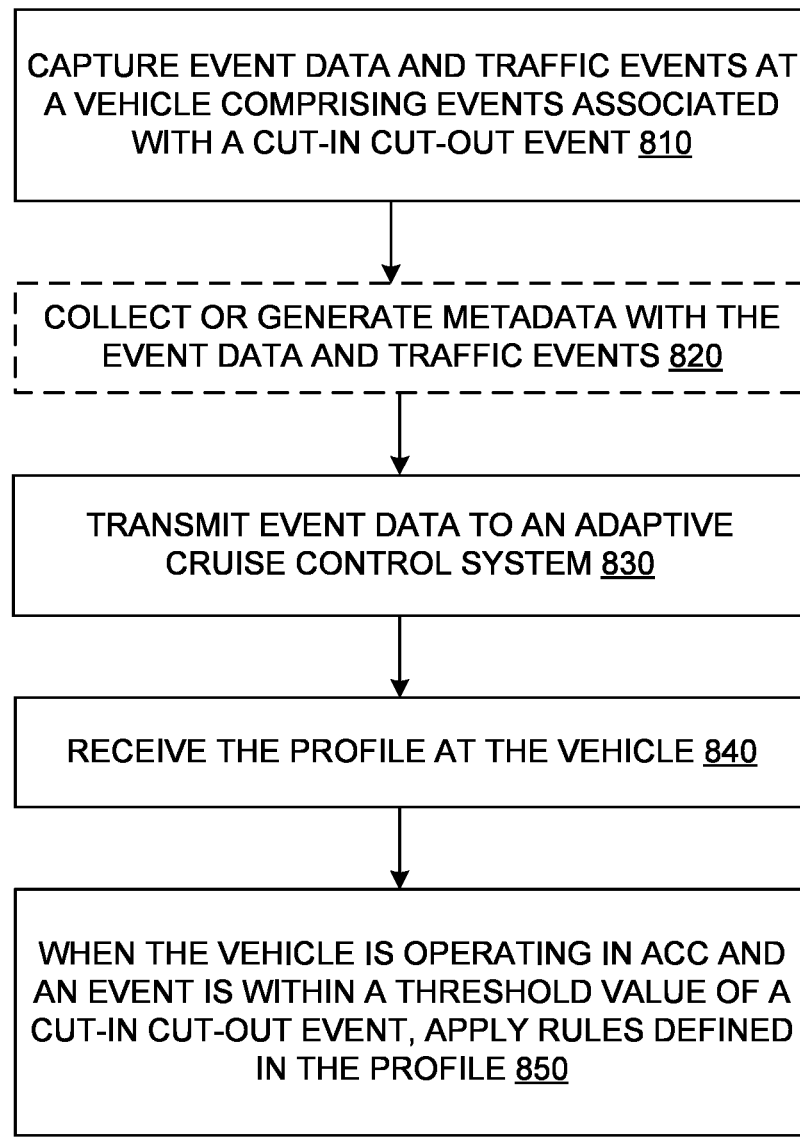
FIG. 8 is an illustrative process for implementing adaptive cruise control (ACC) in accordance with some embodiments of the systems and methods described herein.

FIG. 8 is an illustrative process for implementing adaptive cruise control (ACC) in accordance with some embodiments of the systems and methods described herein. In example 800, a vehicle system may perform various functions described herein, including the vehicle and the adaptive cruise control system illustrated in FIG. 3. In some examples, the system may perform a series of operations and transmit instructions to vehicles described herein.

At block 810, the process may capture event data comprising driver operations and traffic events associated with a cut-in cut-out event. For example, event data associated with driver operations may comprise any detectable attributes of the environment within the vehicle, which can be captured by the vehicle itself or another device. Event data associated with traffic events may comprise any detectable attributes of the environment outside of the vehicle, which can be captured by the vehicle itself or another device.

The event data may be determined by an image sensor (e.g., associated with a camera or with LIDAR) to detect light/darkness internal and external to the vehicle, a number of passengers in the vehicle, a number of vehicles surrounding the ego vehicle (e.g., to detect light or heavy traffic), recognizable landmarks (e.g., to detect urban or rural settings), paved or unpaved roadways, or other images that may be captured by the image sensors associated with the vehicle. In another example, the vehicle may comprise weight sensors in the seats of the vehicle to detect passengers in addition to the driver in the vehicle. In another example, the vehicle may comprise sensors to detect weather (e.g., sunny, rainy, 72 degrees, etc.) or receive weather reports from a third party source.

At block 820, the process may optionally collect or generate metadata with the event data and traffic events. For example, metadata may be generated and transmitted with the event data. The metadata may identify a location where the event data is captured. In some examples, the metadata may identify a number of passengers that are traveling in the vehicle with the driver when the event data is captured. Other information may be stored as metadata, as further discussed herein.

At block 830, the process may transmit the event data associated with the vehicle to an adaptive cruise control system. In some examples, the adaptive cruise control system uses the event data as input to a machine learning model. For example, the event data may be provided as input to a trained, supervised machine learning model and the output may be a label or other classification of the type of event based on a classification score associated with the event. In this sense, events that are classified with the same label (e.g., over a threshold value) can be clustered with other similar events.

In some examples, the process may determine the events that have been classified as corresponding with a cut-in event or an event corresponding with a cut-out event from the labels. These events may be filtered and separately analyzed as part of the machine learning model training in generating a profile that models the driver's reactions to cut-in and cut-out events (e.g., speed up, slow down, etc.).

In some examples, the profile defines rules to operate the vehicle in ACC to speed up or slow down the vehicle during a future cut-in cut-out event. The process may determine a pattern of vehicle operations that detect the driver's reactions in speeding up or slowing down the vehicle in response to particular event data, traffic events, or metadata. As an illustrative example, the driver may allow vehicles to cut-in when other passengers are in the vehicle or the vehicle is in a rural area, yet may not allow vehicles to cut-in when the driver is on a highway traveling at least 60 mph. When the event data is detected, the driver may exhibit a pattern of speeding up to not allow the cut-in event (e.g., with a threshold amount of space between the ego vehicle and a second vehicle directly in front if it). An aggregation of data is correlated to the acceleration and breaking pattern for the driver.

In some examples, training of the machine learning model updates a profile for the driver that characterizes an observed driving style of the driver in the vehicle during the cut-in cut-out event. For example, during the training, the process may map correlations between input features and the corresponding output labels. The labeled data can be provided as a training data set for the machine learning model.

At block 840, the process may receive the profile at the vehicle. The profile may be received from the adaptive cruise control system. For example, the profile of personalized responses of the driver during cut-in and cut-out events is sent to the vehicle (e.g., a personalization action engine of the vehicle). The machine learning models may be further tuned to be used for ADAS for a particular vehicle.

At block 850, the process may identify the future cut-in cut-out event and apply rules defined in the profile to correspond with the observed driving style of the driver. The future cut-in cut-out event may be identified when the vehicle is operating in ACC and the event is within a threshold value of the cut-in cut-out event (e.g., determined through the labeling process). For example, using the profile while the vehicle is in operation, the profile provides rules/ instructions for the vehicle to take while it is operating in ACC, which may be implemented by the ADAS.

For faster response and in vehicles with suitable compute power, the adaptive cruise control system can be implemented at the vehicle. In turn, the machine learning training can be performed locally at the vehicle and locally update the models and personalized profile for future use.

Figure 9:
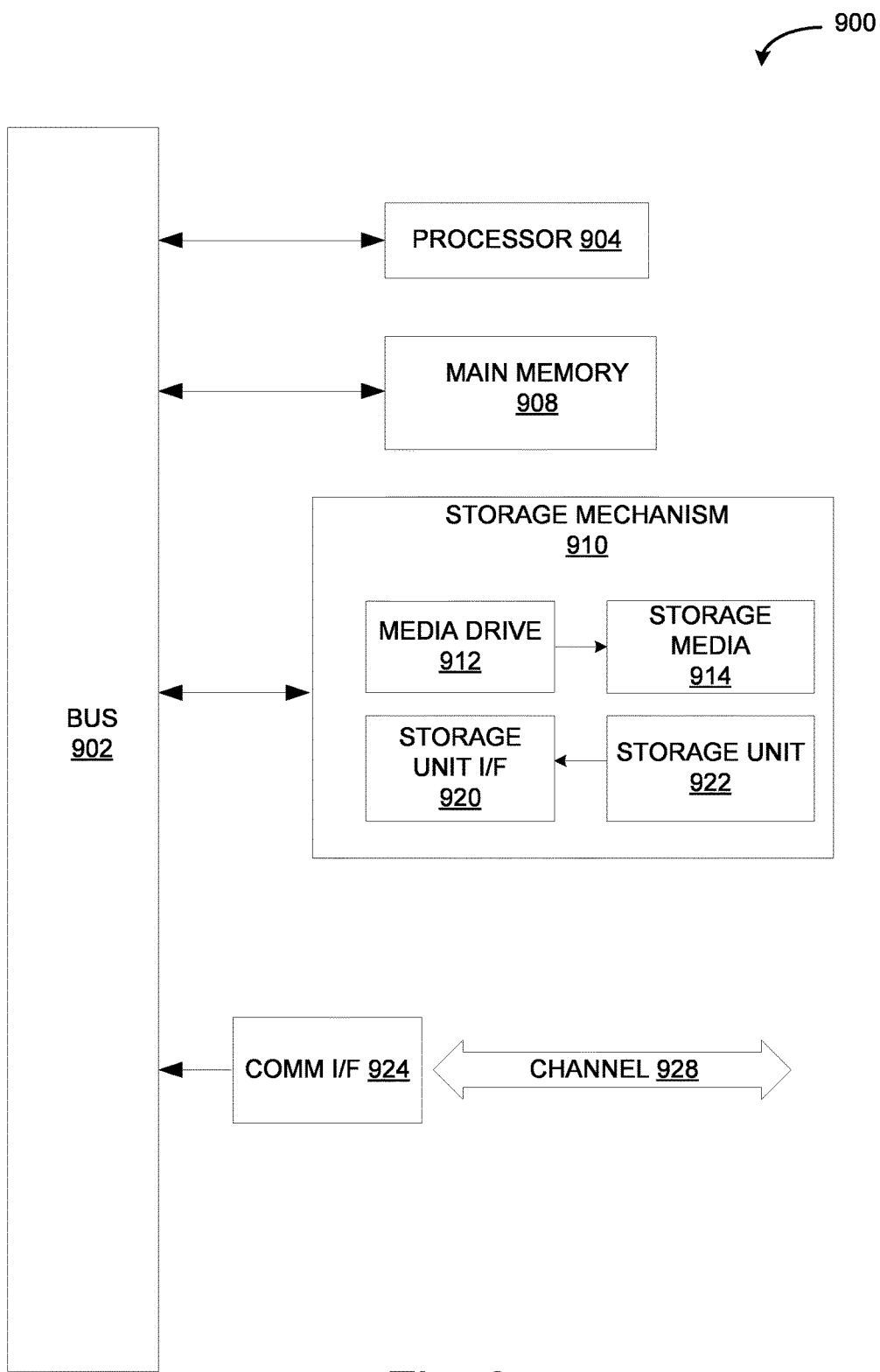
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/ functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor, and/or any one or more of the components making up a user device, user system, and non-decrypting cloud service. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 902.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle control system in a vehicle configured to implement personalized adaptive cruise control (ACC), the vehicle control system comprising:
    an ACC circuit;
    a processor; and
    memory coupled to the processor to store instructions, which when executed by the processor, cause the processor to perform operations, the operations comprising:
        capture event data associated with the vehicle, the event data comprising driver operations and traffic events associated with a cut-in cut-out event;
        transmit the event data associated with the vehicle to an adaptive cruise control system,
            wherein the adaptive cruise control system uses the event data as input to a machine learning model,
            wherein training of the machine learning model updates a profile for a driver that characterizes an observed driving style of the driver in the vehicle during the cut-in cut-out event, and
            wherein the profile defines rules to operate the vehicle in ACC to speed up or slow down the vehicle during a future cut-in cut-out event;
        receive, from the adaptive cruise control system, the profile at the vehicle; and
        when the vehicle is operating in ACC and an event is within a threshold value of the cut-in cut-out event, identify the future cut-in cut-out event and apply the rules defined in the profile to correspond with the observed driving style of the driver.

2. The vehicle control system of claim 1, wherein applying the rules defined in the profile include slowing down the vehicle to widen a gap between the vehicle and a second vehicle in front of the vehicle.

3. The vehicle control system of claim 1, wherein applying the rules defined in the profile include increasing speed of the vehicle to close a gap between the vehicle and a second vehicle in front of the vehicle.

4. The vehicle control system of claim 1, wherein the machine learning model comprises an event classifier that detects events while ACC is activated, a filtering module that separates cut-in cut-out events from other events while ACC is activated, and an acceleration and braking pattern classifier.

5. The vehicle control system of claim 1, wherein metadata is generated and transmitted with the event data, and the metadata identifies a location where the event data is captured.

6. The vehicle control system of claim 1, wherein metadata is generated and transmitted with the event data, and the metadata identifies a number of passengers that are traveling in the vehicle with the driver when the event data is captured.

7. The vehicle control system of claim 1, wherein the vehicle comprises weight sensors incorporated with seats of the vehicle or image sensors to detect passengers in the vehicle in addition to the driver, and incorporates the passengers with the driver with adjusting the profile.

8. The vehicle control system of claim 1, wherein metadata is generated and transmitted with the event data, and the metadata comprises location information collected from a global positioning system (GPS) sensor or other location-based sensor.

9. The vehicle control system of claim 1, wherein metadata is generated and transmitted with the event data, and the metadata identifies a type of sensor that is generating information that is stored and transmitted as the metadata.

10. The vehicle control system of claim 1, wherein the adaptive cruise control system is located remote from the vehicle in a cloud-based server.

11. The vehicle control system of claim 1, wherein the adaptive cruise control system is located locally at the vehicle to update the machine learning model and the profile for future use.

12. The vehicle control system of claim 1, wherein the ACC circuit is part of an advanced driver-assistance system (ADAS).

13. A method of implementing personalized adaptive cruise control (ACC), the method comprising:
    capturing, by a vehicle control system comprising an ACC circuit, a processor, and memory, event data associated with a vehicle, the event data comprising driver operations and traffic events associated with a cut-in cut-out event;
    transmitting, by the vehicle control system, the event data associated with the vehicle to an adaptive cruise control system,
        wherein the adaptive cruise control system uses the event data as input to a machine learning model,
        wherein training of the machine learning model updates a profile for a driver that characterizes an observed driving style of the driver in the vehicle during the cut-in cut-out event, and
        wherein the profile defines rules to operate the vehicle in ACC to speed up or slow down the vehicle during a future cut-in cut-out event;
    receiving, from the adaptive cruise control system, the profile at the vehicle; and
    when the vehicle is operating in ACC and an event is within a threshold value of the cut-in cut-out event, identifying the future cut-in cut-out event and applying the rules defined in the profile to correspond with the observed driving style of the driver.

14. The method of claim 13, wherein applying the rules defined in the profile include slowing down the vehicle to widen a gap between the vehicle and a second vehicle in front of the vehicle.

15. The method of claim 13, wherein applying the rules defined in the profile include increasing speed of the vehicle to close a gap between the vehicle and a second vehicle in front of the vehicle.

16. The method of claim 13, wherein the machine learning model comprise an event classifier that detects events while ACC is activated, a filtering module that separates cut-in cut-out events from other events while ACC is activated, and an acceleration and braking pattern classifier.

17. The method of claim 13, wherein metadata is generated and transmitted with the event data, and the metadata identifies a location where the event data is captured.

18. The method of claim 13, wherein metadata is generated and transmitted with the event data, and the metadata identifies a number of passengers that are traveling in the vehicle with the driver when the event data is captured.

19. The method of claim 13, wherein the vehicle comprises weight sensors incorporated with seats of the vehicle or image sensors to detect passengers in the vehicle in addition to the driver, and incorporates the passengers with the driver with adjusting the profile.

20. The method of claim 13, wherein metadata is generated and transmitted with the event data, and the metadata comprises location information collected from a global positioning system (GPS) sensor or other location-based sensor.

* * * * *